(12) United States Patent
DeChiaro, Jr.

(10) Patent No.: US 7,804,441 B1
(45) Date of Patent: Sep. 28, 2010

(54) DETECTION OF CONCEALED OBJECT BY STANDING WAVES

(75) Inventor: Louis F. DeChiaro, Jr., Middletown, DE (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 443 days.

(21) Appl. No.: 11/890,098

(22) Filed: Jul. 13, 2007

(51) Int. Cl.
*G01S 13/04* (2006.01)

(52) U.S. Cl. ............................. 342/22; 342/5; 342/27
(58) Field of Classification Search ............... 342/22
See application file for complete search history.

(56) References Cited

U.S. PATENT DOCUMENTS

| | | | | |
|---|---|---|---|---|
| 2,038,878 | A * | 4/1936 | Strutt | 340/553 |
| 2,165,214 | A * | 7/1939 | Blau et al. | 73/19.09 |
| 2,649,538 | A * | 8/1953 | Marlowe et al. | 340/552 |
| 3,019,430 | A * | 1/1962 | Pedersen et al. | 342/83 |
| 3,065,455 | A * | 11/1962 | Roth | 367/95 |
| 4,079,361 | A * | 3/1978 | Woode | 342/27 |
| 4,191,953 | A * | 3/1980 | Woode | 340/552 |
| 4,219,802 | A * | 8/1980 | Ceseri | 340/552 |
| 4,262,246 | A | 4/1981 | Fujii | 324/58 |
| 4,327,358 | A * | 4/1982 | Karas | 342/27 |
| 4,399,403 | A * | 8/1983 | Strandberg et al. | 324/640 |
| 4,481,516 | A * | 11/1984 | Michelotti | 340/933 |
| 4,580,249 | A | 4/1986 | Magee et al. | 367/94 |

(Continued)

OTHER PUBLICATIONS

Inomata et al. "Microwave Back-Projection Radar for Wide-Area Surveillance System." 34th European Microwave Conference, 2004. vol. 3, Issue 11-15. pp. 1425-1428. Oct. 2004.*

(Continued)

*Primary Examiner*—Thomas H Tarcza
*Assistant Examiner*—Matthew M Barker
(74) *Attorney, Agent, or Firm*—Gerhard W. Thielman, ESQ

(57) ABSTRACT

A process is provided to detect an object within a defined region using standing longitudinal cavity mode waves. The process includes disposing first and second electromagnetic reflectors within the region at opposite ends of the axis; transmitting an electromagnetic signal into the region in proximity to the first reflector, measuring a received signal in proximity to the second reflector, extracting an appropriate parameter from the received signal to obtain a received characteristic, comparing the received characteristic to an established characteristic that lacks the object to obtain a characteristic differential, and analyzing the characteristic differential to obtain a position of the object between the reflectors. The analyzing can be performed by Fourier transform across wave modes. In an alternate embodiment, the process involves first and second conductive lines disposed substantially parallel to the axis for a specified length and separated from each other by a specified width, the length and width bounding the defined region. The alternative process further includes transmitting an electromagnetic signal through the first line at a set frequency, returning the transmitted signal through the second line, measuring power from a reflected signal through the first line, adjusting the set frequency based on the measured power, extracting an appropriate parameter from the reflected signal to obtain a reflected characteristic, comparing the reflected characteristic to an established characteristic that lacks the object to obtain a characteristic differential, and analyzing the characteristic differential to obtain a position of the object along the length.

15 Claims, 8 Drawing Sheets

U.S. PATENT DOCUMENTS

| | | | |
|---|---|---|---|
| 4,661,936 A * | 4/1987 | Magee et al. | 367/94 |
| 4,792,804 A * | 12/1988 | Rubechini | 342/27 |
| 4,874,942 A | 10/1989 | Clauser | 250/251 |
| 5,210,521 A * | 5/1993 | Hojell et al. | 340/436 |
| 5,343,145 A | 8/1994 | Wellman et al. | 324/202 |
| 5,438,318 A * | 8/1995 | Latorre et al. | 340/554 |
| 5,498,863 A | 3/1996 | Miller | 250/214.1 |
| 5,604,301 A * | 2/1997 | Mountford et al. | 73/54.31 |
| 6,003,370 A | 12/1999 | Yukawa et al. | 73/504.01 |
| 6,127,926 A * | 10/2000 | Dando | 340/541 |
| 6,326,213 B1 | 12/2001 | Letcher et al. | 436/518 |
| 6,466,157 B1 * | 10/2002 | Bjornholt et al. | 342/28 |
| 6,788,072 B2 | 9/2004 | Nagy et al. | 324/639 |
| 6,950,021 B2 * | 9/2005 | Butler | 340/545.3 |
| 7,088,236 B2 * | 8/2006 | Sorensen | 340/539.13 |
| 7,133,032 B2 * | 11/2006 | Cok | 345/175 |
| 7,145,502 B2 | 12/2006 | Uebo et al. | 342/131 |
| 2004/0119966 A1 * | 6/2004 | Iritani et al. | 356/4.09 |
| 2006/0152229 A1 | 7/2006 | Ju | 324/637 |
| 2007/0274158 A1 * | 11/2007 | Agam et al. | 367/96 |

OTHER PUBLICATIONS

Yamada, M. et al., "Analysis of Gain Suppression in Undoped Semiconductor Lasers", *J. Appl. Phys.*, 52, 2653-2664 (1981).

DeChiaro, L. et al., "Effects of Drive Current Upon Defect Distribution Scan Features in Multi-longitudinal Mode Semiconductor Lasers", *J. Lightwave Technology*, 11, 2057-2065 (1993).

Cooley, J. et al., "An Algorithm for the Machine Calculation of Complex Fourier Series", *Mathematics of Computation*, 19, 297-301 (1965).

* cited by examiner

DETECTION OF CONCEALED OBJECT BY STANDING WAVES

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to methods and systems that use standing waves to detect a buried or submerged object in an optically opaque medium. In particular, the invention employs electromagnetic or sonic waves and analyzes their standing wave patterns to identify the presence and location of an otherwise hidden object having material characteristics that differ from the medium into which the object is embedded.

Military personnel may be assigned to patrol regions where hostile combatants operate. Concealed ordnance, e.g., landmine, improvised explosive device (IED), present a severe hazard of injury and/or death in such reconnaissance roles. The difficulty in identifying, locating and neutralizing such objects from a safe distance hampers efforts to pacify these territories by elevating risk to travelers (especially those on patrol) well above acceptable levels.

SUMMARY

Conventional techniques to detect unauthorized intrusion yield disadvantages addressed by various exemplary embodiments of the present invention. In particular, various exemplary embodiments provide a mechanism to detect such target objects with greater safety distance margins than conventionally available.

Various exemplary embodiments provide electromagnetic tomography implemented by spectral analysis in an excited Fabry Perot cavity to detect and locate enemy agents crossing security perimeters or buried enemy ordnance, such as improvised explosive devices (IEDs) within localized volumes such as the soil lying underneath roadways upon which Coalition military vehicles must travel on a regular basis. Variant embodiments employ radio frequency electromagnetic waves or sonic waves, depending on application. Microwaves represent an exemplary portion of the electromagnetic spectrum in conjunction with microwave frequency computer-aided tomography (MCAT) implemented by spectral analysis.

Various exemplary embodiments provide methods and systems to detect an object within a defined region using standing longitudinal cavity mode waves. The process includes disposing first and second microwave reflectors within the region along a longitudinal axis at opposite ends of the axis, transmitting an electromagnetic signal into the region near the first reflector, measuring a received signal near the second reflector, extracting an appropriate parameter from the received signal to obtain a received characteristic; comparing the received characteristic to an established characteristic that lacks the object to obtain a characteristic differential; and analyzing the characteristic differential to obtain a position of the object between the reflectors. These procedures may include recording the received signal by suitable instruments to obtain a received frequency spectrum, comparing the received frequency spectrum to an established frequency spectrum without the object, and Fourier transforming the difference to compute an intelligence function containing the target location.

In various exemplary embodiments, the process involves first and second conductive lines disposed substantially parallel to the axis for a specified length and separated from each other by a specified width, the length and width bounding the defined region. The two lines constitute a parallel-conductor radio-frequency transmission line stub. The alternative embodiments further includes transmitting a swept radio frequency signal along the transmission line, measuring the frequency, amplitude, and width of the resonant mode peaks, comparing the frequencies, amplitudes and widths to those previously obtained without target objects in the vicinity of the transmission line, and Fourier transforming the difference thereby computed.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
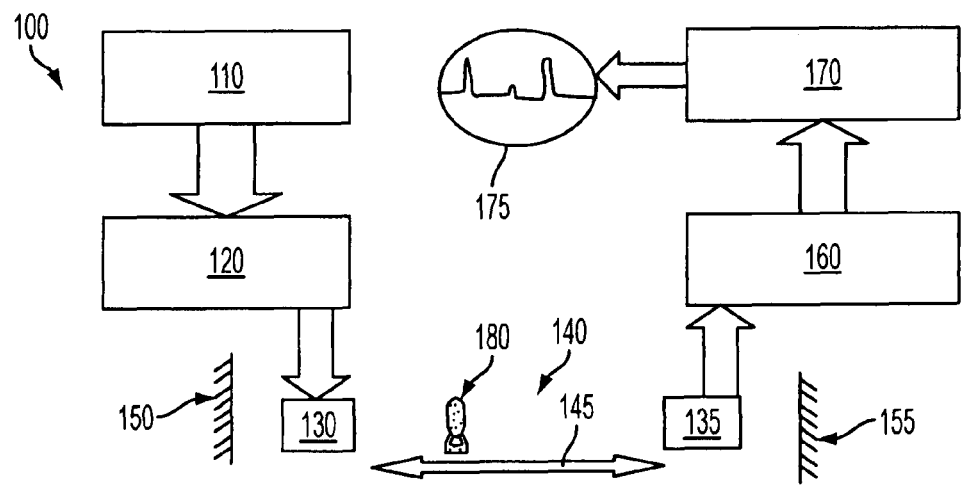
FIG. 1 is a block diagram view of the system according to a reflector embodiment.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Radar employs electromagnetic radiation to provide azimuth, elevation and range of an object. A transmitter projects radiation in the microwave or radio spectrum. An object within line-of-sight of the transmitter reflects a portion of the radiated energy, which proceeds as a traveling electromagnetic wave back, to a receiver, whereupon the radar system analyzes the reflected signal to obtain the desired information. However, signal attenuation of short radiation wavelengths, at high frequencies, limit signal propagation and detection distances. For low frequencies, the object might escape detection if smaller than the long radiation wavelengths having less attenuation.

The object possesses material properties that differ from the concealing medium. These properties influence real and/or imaginary portions of the refraction index at microwave frequencies, thereby indicating the object's presence. A defined area of the medium may be interrogated with standing waves that encompass a suitable range of wavelengths. The standing wave patterns contain integer numbers of nodes and antinodes, each of which is located at a known position along the cavity length. The object betrays its presence by selective absorption or scatter of the energy, rather than by reflection. The changes in energy, frequency and quality associated with standing wave patterns (from an empty medium) depend on the object's location.

The standing waves represent wavelengths related to the length of the area being searched for the object's presence and location. The search area may be designated as a "cavity" having characteristic length L for the distance between boundaries against which the waves reflect, such as a Fabry-Perot cavity. The wavelength $\lambda = v/f$, where f is frequency and v is the wave velocity for each longitudinal mode in the cavity has a quantized value that may be expressed as $\lambda = 2L/n$, where n is a positive integer $1, 2, \ldots N$, and L is the cavity length. For an electromagnetic wave, this velocity corresponds to nearly the speed of light. For an acoustic wave, this velocity corresponds to the longitudinal speed of sound, or additionally the transverse speed of sound for a solid medium.

For the twin-lead application, the waves may be reflected at the boundaries of the search area to produce a node at the shorted end of the transmission line, an antinode at the open end of the line, and some integer number of nodes and antinodes along the length of the line, the exact numbers being proportional to the frequencies of each standing wave mode. For a shorted far-end of the transmission line (closed circuit), the transmission line length L must be an odd number multiple of a quarter wavelength $\lambda$ for each mode. This can be expressed as $L=(2n+1)\lambda/4$, where n is a non-negative integer $0, 1, 2, \ldots N$. The object can perturb the standing wave either by shifting the frequency of the mode peaks, or by changing the amplitude of the power at the mode peaks.

Modern radar typically depends upon the reflection of very short microwave-frequency pulses by a target of interest. Unfortunately, the presence of microwave signals is recognized by many adversaries, some of whom have deployed buried or camouflaged ordnance with very small radar scattering cross sections and used it successfully against US forces in Iraq and Afghanistan. The problem of locating, identifying, and neutralizing enemy agents and ordnance (particularly buried IEDs) at a distance has been a vexing challenge for US military analysts and a major personal risk for Coalition warfighters.

Reflector Embodiment: Fortunately, recent developments in optoelectronic component technology may be applied fruitfully to address problems such as the detection of buried IEDs in arid Middle Eastern soil and the location of enemy agents crossing long security perimeters. An enemy agent or IED inherently contains substances that exhibit real and/or imaginary components of the index of refraction at audio, ultrasonic, radio, or microwave frequencies that do not precisely match those of the surrounding air in which an agent may traverse or else the soil within which an IED may be buried.

If such a target (operative or ordnance) can be interrogated with a set of standing radio waves that encompass a suitable range of wavelengths, the presence of the target causes absorption or scattering whose magnitude is dependent upon the precise location of the target with respect to the nodes and antinodes of each of the standing wave mode patterns. Thus the introduction of a target into a volume that has been illuminated with a set of standing waves having an initially-uniform distribution of power perturbs this distribution of power among the various wave modes. In addition, the frequencies and/or the quality of the standing wave modes may be perturbed by the presence of the target object.

This perturbation can be accurately measured with modern spectral analysis instrumentation, and the location of the target can then be extracted from this perturbation by an appropriate type of mathematical analysis. Furthermore, this method of detection is most sensitive to objects that are comparable to or smaller than the smallest wavelength used to interrogate them and is therefore not subject to the usual diffraction limit that affects conventional imaging technologies.

The detection algorithm (to be described subsequently) relies upon the differential absorption or scattering of a set of standing wave mode patterns and not upon the reflection of a narrow band of wavelengths as in traditional radar or imaging technology. This location technique can also circumvent countermeasures to conceal hostile operatives or ordnance by using stealth technologies that absorb electromagnetic radiation in the radar frequency bands. The standing wave pattern can be created by establishing a Fabry-Perot cavity in one or more physical dimensions and exciting a set of standing wave modes within this cavity by use of a low power microwave transmitter. The cavity is formed by placing two highly reflecting "mirror" surfaces at the ends of the desired region to be protected and orienting them so that they are parallel.

This ensures that waves with propagation directions parallel to the cavity axis may travel back and forth within the cavity and experience multiple reflections at the two mirror ends. In order to ensure that a large set of modes is excited within the cavity, the transmitter sweeps often over a sufficiently wide bandwidth to encompass the desired range of wavelengths. For the various embodiments presented herein, the instant disclosure proposes the exploration of a new technology that exploits the differential absorption and/or scattering of a set of standing waves to detect and locate accurately a concealed target and presents results from two preliminary trials of the technology.

Diagram: FIG. 1 shows a block diagram 100 of the detection system. A generator 110 provides an electromagnetic wave signal to a transmitter 120, which projects the signal through a transmit antennas 130 to be intercepted by a receive antenna 135, with both antennas (e.g., transducers or horns) being embedded within a cavity 140. The signal propagates within the cavity 140 through a medium (e.g., air, soil, water) along a longitudinal axis 145. The cavity 140 is bounded at each end by corresponding reflectors 150, 155 (e.g., microwave mirrors). Frequencies of the signal received by the receive horn 135 are evaluated by a radio frequency (RF) signal analyzer 160 and further processed by a computer 170, which may illustrate the resulting modes on a display monitor 175. By monitoring the frequency modes, a change therein indicates the presence of a target 180, shown as a buried IED.

The reflectors 150, 155 are oriented parallel to each other, being disposed at the longitudinal ends of the cavity 140, which represents a region to be monitored. The longitudinal cavity axis 145 is formed by a line perpendicular to the reflectors 150, 155 that extends the distance length of the cavity 140. These mirrors may be flat or parabolically curved to focus the reflected waves.

The transmitter 120 may transmit microwaves at low power, and these microwaves are frequency-swept by modulation generator 110 for sending to the transmit antenna 130. This transmit antenna 130 would generally be implemented as an electromagnetic horn, possibly with some gain over an isotropic radiator to confine most of the radiation to the direction of the cavity axis 145.

The power generated by the frequency-swept transmitter 120 is injected through the transducer 130 and into the cavity 140 as electromagnetic radiation. This power may be attenuated because some waves are emitted in directions that are not parallel to the cavity axis 145. That fraction of the power in waves that run parallel to the cavity axis 145 travel back-and-forth between the two reflectors 150, 155 and resonate within the cavity 140 at all discrete frequencies for which the cavity length L is an exact integer multiple of a half-wavelength.

These standing waves interact with the target 180, which will selectively absorb or scatter some of the cavity modes. As a result, the overall shape of the spectrum is perturbed by the presence of the target 180. This perturbed spectrum can be detected by receive antenna 135 and analyzed by the spectrum analyzer 160, which sends its information to the computer 170 through an appropriate interface (e.g., GPIB, USB) and processed by a suitable program. The computer 170 analyzes the spectral shape using an algorithm presented further herein. As a result of this analysis, the computer 170 extracts from the spectral shape an intelligence function that is displayed on the monitor 175. The horizontal axis of this plot represents distance, and the vertical axis represents deviation from average cavity materials properties. The target 180 is thus represented by a peak in the monitor 175 that resembles the blip on a traditional radar range scan.

Figure 2:
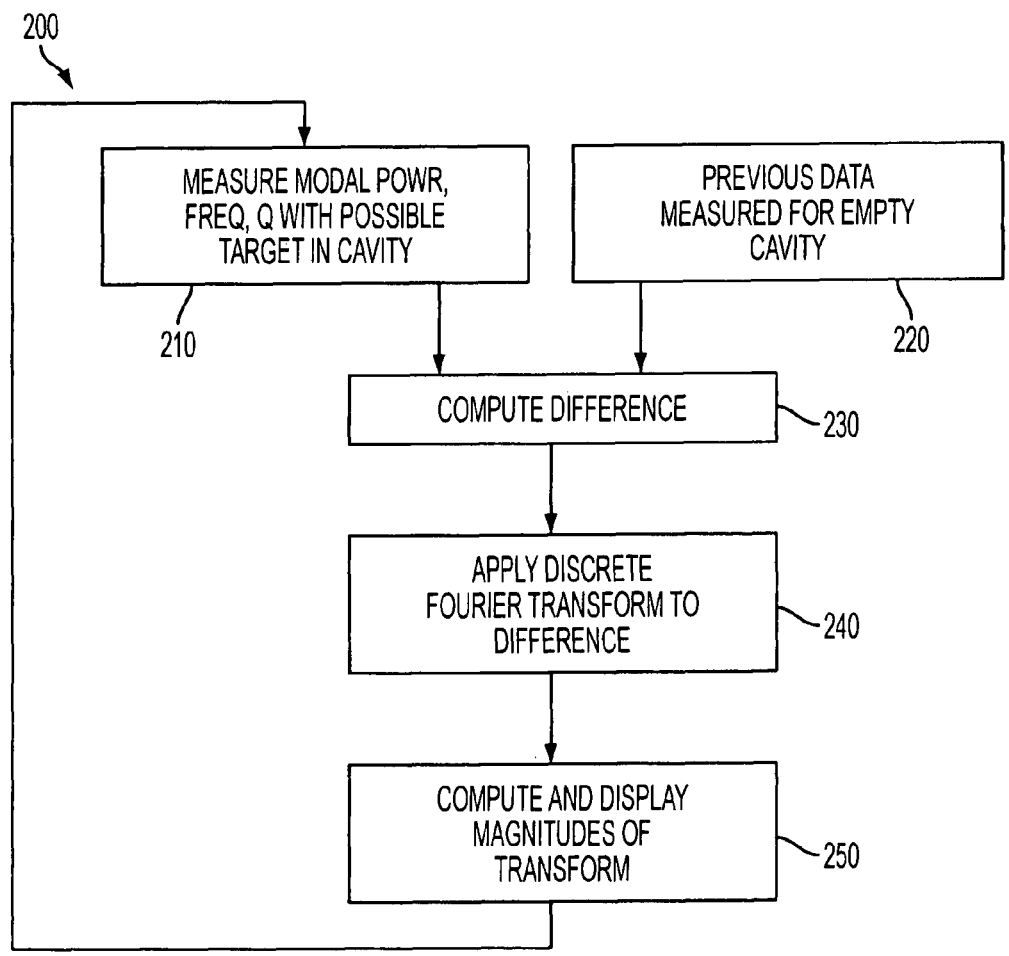
FIG. 2 is a flowchart view of the signal analysis process for detecting an object.

Process: FIG. 2 illustrates a flowchart 200 that describes the analysis and procedure for receiving and processing the standing wave signals to detect an intrusive object within a defined region. An iterative step 210 provides data resulting from the measurement of the power, frequencies and/or quality (denoted as Q) for each of a suitably large number of longitudinal cavity modes. Previously acquired data under conditions absent any target are acquired and stored at step 220. These results from step 210 are compared at step 230 with the corresponding data from step 220.

The algebraic difference between these two data sets, computed at step 230, are then subjected to the Discrete Fourier Transform at step 240. The magnitude of the output data set from step 240 is computed in step 250 and either displayed for observation by a human operator and/or analyzed by the software for automatic detection of target peaks. After a suitable period of time, the process is repeated, and the program flow returns to step 210 to begin the analysis of the next set of data acquired by the receiver.

Algorithm: The mathematical details of a microwave frequency computer-aided tomography (MCAT) Algorithm used to process the received spectrum and extract therefrom the intelligence function that bears information on the location of targets of interest. This detection system relies upon the creation of a Fabry-Perot cavity that bounds the cavity 140 that defines the spatial region. This cavity 140 consists of two parallel mirrors 150, 155, separated by a longitudinal distance L.

One of the well-known properties of such cavities is that standing waves can resonate in the region between the mirrors 150, 155 only at those discrete frequencies for which the cavity length L is an integral multiple of a half wavelength;

$$L = \frac{m\lambda_m}{2}, \qquad (1)$$

where $\lambda_m$ is the wavelength of the longitudinal cavity mode for which m half wavelengths exactly fit in the region between the reflectors. For this example, the cavity length L is in the range of 10 km (kilometers). Specific field-deployable implementations of this invention may utilize cavity lengths ranging from tens of meters to tens of kilometers.

Artisans of ordinary skill will recognize that the frequency separation $\delta f$ between adjacent longitudinal modes is given by the expression:

$$\delta f = \frac{c}{2nL}, \qquad (2)$$

where c is the speed of light in vacuo, and n is the index of refraction. For n=2 as a reasonable value for soil in the arid climates of the Middle East at low microwave frequencies, the adjacent modal separation is in the neighborhood of 7.5 kHz (kilo-Hertz), a value easily resolved with modern microwave spectrum analyzers.

This Fabry-Perot cavity can be excited by a low-GHz (giga-Hertz) frequency microwave transmitter 120 via the transmit horn (or other suitable antenna) 130 to carry the transmitter's signal in the cavity 140. The transmit antenna 130 may preferably be disposed in close proximity to one of the two parallel reflectors 150, both disposed within the soil of the region comprising the cavity 140. For the transmitter 120 being frequency-swept by the generator 110 over a bandwidth of 130 MHz in a low GHz band, the resulting bandwidth may be sufficient to encompass about 17,300 longitudinal modes, each distinguished by the 7.5 kHz modal separation interval.

Assuming that signal losses associated with absorption in the medium (e.g., soil) are not excessive, these longitudinal modes lying within the frequency-swept bandwidth of the transmitter 120 may resonate within the cavity 140. These cavity modes may be detected by the receive antenna 135 placed in the soil near the other reflector 155 and connected to the RF spectrum analyzer 160.

Quantifying the energy present in each of these longitudinal modes can be achieved by a set of traditional first-order rate equations. These are similar to the rate equations for a semiconductor laser, but modified slightly to make them applicable to the geometry in FIG. 1. For $S_m$ being the number of photons-per-cubic-meter associated with the $m^{th}$ longitudinal mode (i.e., amplitude), $\alpha_m$ is the loss associated with the same mode, $P_t$ being the RF power output of the microwave transmitter, and $C_m$ being the probability-per-unit-time of exciting a photon in the $m^{th}$ longitudinal mode, the rate of change in photon density for the $m^{th}$ mode may be written as follows:

$$\frac{dS_m}{dt} = C_m P_t - \frac{c}{n}\alpha_m S_m. \quad (3)$$

The spectrum analyzer 160 may be used to measure the relative amplitude $S_m$ of each longitudinal mode. To model signal loss as a function of wavelength, an analogy to first order laser gain may be applied. This first order laser gain is modulated by the first moment of the spatial gain with respect to the square of the longitudinal mode electric field distributions. See, e.g., Yamada, M. and Suematsu, Y., "Analysis of Gain Suppression in Undoped Semiconductor Lasers", *J. Appl. Phys.*, 52, 2653-2664, (1981).

This insight was applied for various exemplary embodiments in creating the software for the laser Defect Distribution Scan Algorithm. See, e.g., DeChiaro, L., Robinet, M., and Devoldere, P., "Effects of Drive Current Upon Defect Distribution Scan Features in Multi-longitudinal Mode Semiconductor Lasers", *J. Lightwave Technology*, 11, 2057-2065, (1993). The same principle may be extended to the presence of a target of interest such as a concealed enemy agent or a buried IED. Due to the various internal constituents, the presence of the target may create a sharply-localized perturbation in the real and/or the imaginary components of the index of refraction of the surrounding medium.

The physical size of the target 180 may be sufficiently small so as to exhibit a negligible scattering cross section at low microwave frequencies. Nonetheless, its presence yields a frequency-selective attenuation of some of the longitudinal modes, depending upon its exact longitudinal coordinate relative to the nodes and antinodes of the modal electric field distributions. Thus, the loss for the $m^{th}$ longitudinal mode may be modeled as follows:

$$\alpha_m = \alpha_0 + \int_0^L G(z)|E_m(z)|^2 dz, \quad (4)$$

where $\alpha_o$ is the constant background loss, $G(z)$ is the spatially-dependent loss (i.e., intelligence function) represented by any perturbations of the cavity medium (including IEDs, buried rocks, subterranean tunnels, or foliage), and $E_m(z)$ is the electric field distribution of the $m^{th}$ mode.

For the spectrum analyzer 160 able to measure values of photon density $S_m$ for many excited cavity modes, eqns. (3) and (4) may be solved by a simple Fourier Transform method to obtain the intelligence function $G(z)$. In steady state, all the time derivatives in the system for eqn. (3) vanish, and eqn. (3) may then be solved for the steady state spectrum to obtain:

$$S_m = \frac{nC_m P_t}{c(\alpha_0 + \int_0^L G(z)|E_m(z)|^2 dz)}. \quad (5)$$

Next, the cavity losses may be postulated as not being exceedingly large. For such a condition, the modal electric field distribution can be approximated as follows:

$$E_m(z) = \sin\frac{2\pi z}{\lambda_m}. \quad (6)$$

Substituting eqn. (6) in the integral in the denominator of eqn. (5) and recalling the trigonometric identity $\sin^2\theta=(1-\cos 2\theta)/2$, eqn. (5) reduces to:

$$S_m = \frac{nC_m P_t}{c\left(\alpha_0 + \frac{L\overline{G}}{2} + \frac{1}{2}\hat{G}^+(\lambda)\right)}, \quad (7)$$

where $\overline{G}$ is the spatial average of $G(z)$ and $\hat{G}^+(\lambda)$ is the Inverse Discrete Fourier Transform of the intelligence function $G(z)$, using the sine functions of the modal electric fields of eqn. (6) as Fourier basis functions for the series expansion.

Because L and $\overline{G}$ are both constants, the second term in the denominator of eqn. (7) may be combined into the $\alpha_0$ term with no loss of generality. Eqn. (7) can be solved to yield $\hat{G}(\lambda)$, and the intelligence function $G(z)$ retrieved by a Fourier Transform as follows:

$$G(z) = FFT\left[\frac{2nC_m P_t}{cS_m} - 2\alpha_0\right], \quad (8)$$

where FFT designates the Discrete fast-Fourier Transform (FFT) operation.

In order to implement eqn. (8) in software, the parameters remain defined as: $S_m$ is the discrete spectrum measured by the analyzer, $P_t$ is the average RF power supplied by the transmitter, $C_m$ is the probability-per-unit-time of photon emission into the $m^{th}$ longitudinal mode, n is the average index of refraction of the cavity medium, c is the speed of light in vacuo, and $\alpha_o$ is the background loss of the cavity medium.

The $C_m$ probabilities are given by the shape of the radiated emission spectrum of the continuous wave (CW) microwave transmitter and antenna combination. For a reasonably flat frequency response of this combination, the values of $C_m$ should be constant over a bandwidth sufficiently large to encompass about 16,384 longitudinal modes.

The choice of a number of modes that is an integral power of two is made in order to permit the use of the fastest possible software implementation of the Cooley-Tukey Algorithm to perform the Fourier transformation and retrieve the intelligence function $G(z)$ in minimal time. See, e.g., Cooley, J. W. and Tukey, J. W., "An Algorithm for the Machine Calculation of Complex Fourier Series", *Mathematics of Computation*, 19, 297-301, (1965).

In practice, the negative term on the right hand side of eqn. (8) should appear as a direct current (DC) level upon which the wavelength-dependent perturbations associated with the targets ride. This term can therefore be suppressed before the Fourier transform is done. Such practices may enhance the overall numerical sensitivity of the software.

Typically, a function is solved by transform of its inverse, as provided in eqn. (8). However, for results obtained for this intelligence function application, solving by FFT of the function may improve sensitivity for a small target. Thus, the intelligence function $G(z)$ may be alternatively expressed as a Fourier transform of the difference between the photon density $S_m$ for each mode m and a reference value $S_{0m}$ absent any target. This can be expressed as:

$$G(z)=FFT[S_m-S_{0m}]. \quad (9)$$

Acoustic Tests: The MCAT Algorithm may be applied to a wide variety of wave phenomena. A preliminary feasibility test of the concept was therefore accomplished with a minimal investment by running a trial using ultrasonic acoustic water waves in a volume sufficiently small for demonstration purposes. The protected region and the cavity mirrors were both realized by an aquarium (i.e., fish tank) filled with tap water. The glass walls of the tank are very parallel and reflect sound waves.

Because the short dimension of the tank measured about 0.15 m (meter) and the speed of sound in fresh water is taken to be 1435 m/sec (meterspersecond), the modal separation may be computed from eqn. (2) to be 4.78 kHz. Thus, the demonstration used ultrasonic frequency equipment. A low-power function generator such as the Hewlett-Packard (HP) 8111A was chosen for the transmitter 120, and an ICOM PCR1500 radio communications receiver was used as the spectrum analyzer 160. (The PCR1500 is a computer-controlled receiver whose supplied software includes a spectrum analyzer mode and a data recorder function that uses the hard drive of the controlling computer to store the acquired spectra). Low cost piezoelectric transducers were used as the transmit and receive antennas 130, 135.

The signal generator 110 was configured to generate square waves, and the frequency was adjusted to a value close to 4.78 kHz so that the harmonics would fall at the cavity mode frequencies. The PCR1500 was set to scan the frequency range from 50 kHz to 250 kHz and record the spectra measured with and without a target 180 in the cavity 140.

Figure 3:
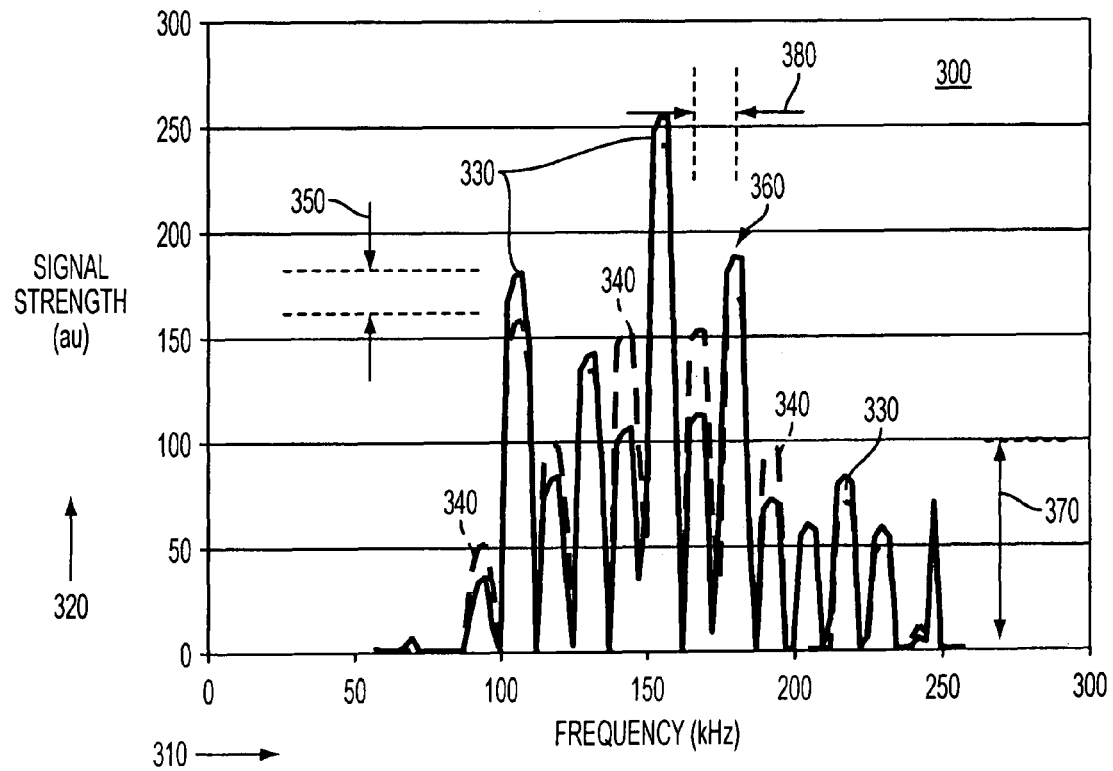
FIG. 3 is a signal mode plot from an acoustic aquarium test.

FIG. 3 illustrates a plot 300 from these acoustic tests. This graph features frequency f up to 300 kHz as the abscissa 310 and signal strength in arbitrary units (au) as the ordinate 320. The graph shows two example spectra: a solid line 330 representing measurements without a target, and a dash line 340 representing measurements in which the tank includes a ballpoint-pen-tip inserted into the water near the tank center. Some of the modes show signal strength differences 350 between the respective measurements. A sharp spike near 250 kHz is caused by a spurious response with the receiver.

An example peak 360, such as at 170 kHz illustrates several additional details. Its peak strength of ~190 au may be used to determine a frequency resolution (i.e., peak width), denoted as $\Delta f$, that represents the frequency difference of the peak 360 at its half peak strength 370. The frequency difference between the peak 360 and its nearest spectral neighbor represents free spectral range (FSR), quantified as v/4d. The FSR may be represented by a frequency difference 380 between modal peaks. (For electromagnetic waves, velocity v is analogous to the speed of light c.) The cavity 140 may be characterized by quality denoted as $Q=f/\Delta f$, and "finesse" quantified as $FSR/\Delta f$.

Compared with the empty cavity spectrum, the spectrum measured with the target in place shows a perturbed shape in which every other mode is enhanced, while the intervening modes are attenuated. The spectral deviation caused by the presence of the target 180 is thus described as a "strong-weak-strong-weak" pattern that is characteristic of a cavity with a perturbation (denoting the target) located at the cavity's mid-position. The period of the spectral deviation is the minimum meaningful value of two mode spacings.

Electromagnetic Tests: The observation of acceptable results from the acoustic test demonstrated the feasibility of the tomography concept. Subsequent trial would involve electromagnetic waves sent through air over a path length that is measured in meters rather than centimeters. Such tests were performed using the large anechoic chamber at Dahlgren with a cavity length of 10 m (meters). An Agilent E8251A signal generator was used as the transmitter.

The best results for these tests were obtained over the 4 GHz to 5 GHz frequency range, using microwave horns as the transmitting and receiving antennas 130, 135. The transmitter 120 was set to cover the frequency band in steps of 1 MHz with a dwell time of 1 s (second) at each frequency. The reflectors 150, 155 were two rectangular pieces of sheet aluminum measuring about 0.6 m-by-1.0 m to act as microwave mirrors. Power levels were about +11 dBm at the transmitter output connector.

A 15 m length of coaxial cable was used between the transmitter output and the transmit antenna. In the 4 GHz to 5 GHz band, this cable exhibits an estimated 8 dB (deci-Bell) loss. Thus, the actual transmitter power at the antenna 130 is estimated to be about +3 dBm (deci-Bell-milliwatt). The transmit and receive antennas 130, 135 were placed in the cavity 140 about 15 cm (centimeters) from the reflectors 150, 155 and oriented so that the microwave beams were directed at the reflectors in order to minimize the signal sent directly from transmit to receive antennas.

Signal reception was implemented by an Agilent E4407B spectrum analyzer and was controlled by a legacy Dolch 486 computer equipped with an HP GPIB interface card. Applications programming was done in the ASYST programming language for reasons of convenience and cost. The E4407B was set to cover the 4 GHz to 5 GHz range. Resolution and video 3 dB bandwidths were each set to 100 kHz, and the time per scan was about 200 ms (milliseconds). The E4407B was programmed to identify the strongest peak in each scan and to report the frequency and strength to the computer 170.

Figure 4:
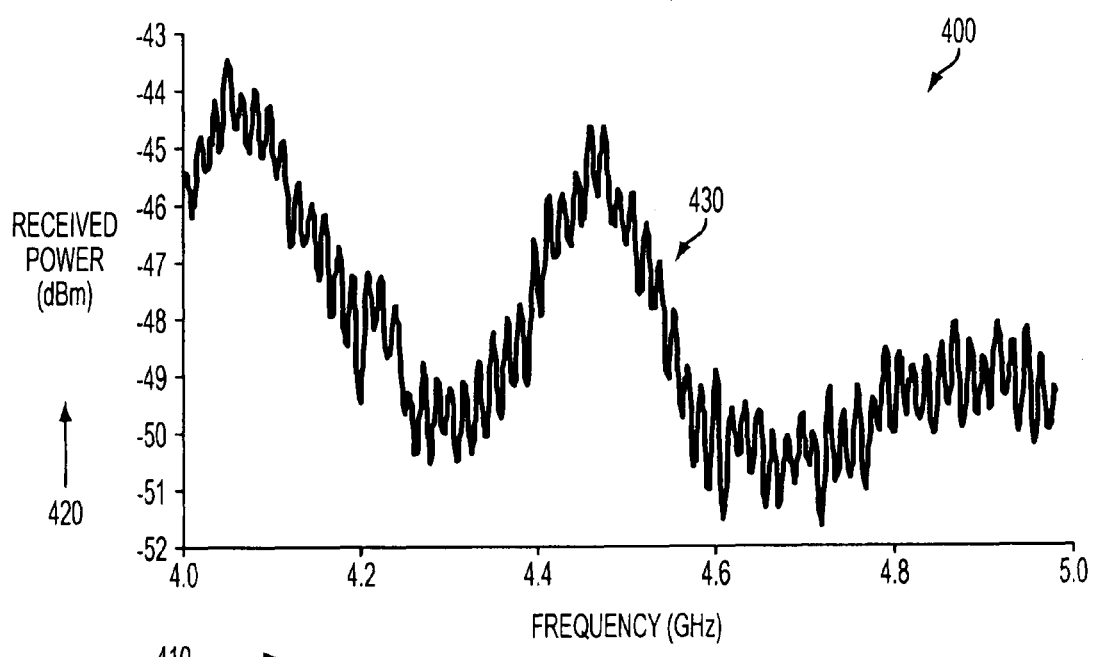
FIG. 4 is a frequency band plot of an electromagnetic microwave signal without a target in the region (representing the cavity)

FIG. 4 shows a plot 400 of the spectrum measured in the absence of any target 180. This graph features frequency between 4 GHz and 5 GHz as the abscissa 410 and received power in dBm as the ordinate 420. A continuous line 430 represents the power for each frequency without a target within the anechoic chamber that defined the cavity 140. The analyzer noise floor was about −72 dBm, and the spectrum consists of about 872 data points.

Received signal strength varied between −43.5 dBm and −51.5 dBm, providing a margin of about 20 dB above the analyzer noise floor. The plot 400 shows considerable structure on both large and small scales. The small scale structure of the line 430 consists of a series of small, regularly-spaced peaks that are separated by about 15.7 MHz on average. This agrees well with the value of 15 MHz that is predicted by eqn. (2) for an air cavity with a length of 10 m. These peaks are therefore the longitudinal mode peaks of the cavity that are necessary for the MCAT Algorithm to operate properly.

The large scale structure also shows evidence of periodic behavior with a period of about 430 MHz in frequency space. This structure is believed to originate in a physical process different from the cavity resonances that give rise to the longitudinal modes mentioned above. One possible candidate mechanism is resonances associated with the feed-horn antennas. These will invariably exhibit some frequency dependence in their radiation pattern, and variation of the main lobe size by a few dB from 4 GHz to 5 GHz is not unreasonable.

Another possibility, however, is that the very presence of the transmit and receive horns 130, 135 and the coaxial cable feed-lines in the cavity 140 can perturb the field configurations due to the scattering of the waves. Thus, the MCAT scans may provide information on any and all objects in the cavity whose real or imaginary parts of the index of refraction differ from those of air. Given the present physical design of our system, this specifically includes the two antennas and some fractional length of their coaxial feed-lines. Additionally, the peak-to-valley contrast of the modes varies between 1 dB and 2 dB can be observed from FIG. 4. Clearly, this contrast is preferably to be as large as possible in order to provide an improved level of sensitivity to a weakly absorbing or reflecting target. This contrast is related to cavity quality Q, related to resolution, and finesse, related to damping time.

The cavity quality Q may be increased by minimizing losses. This process would include spillover losses from the feed-horns (if the reflectors subtend a solid angle smaller than that of the main lobes), as well as diffraction losses and losses due to mirror misalignment and the finite conductivity of the reflector material. Careful engineering design can minimize most of these, and this portends subsequent opportunities to improve the performance and sensitivity of future systems.

Figure 5:
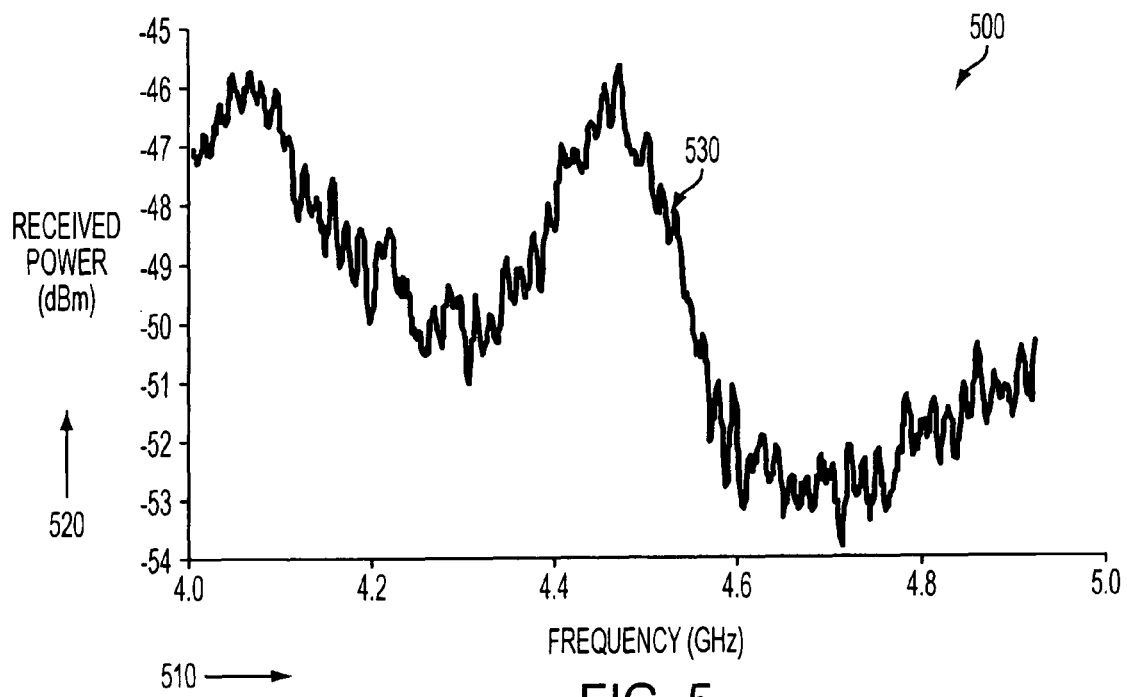
FIG. 5 is a frequency band plot of an electromagnetic microwave signal with a target at the center of the region.

Despite the modest modal contrast shown in FIG. 4, the introduction of a target 180 into the microwave beam resulted in a measurable perturbation of the power distribution among the longitudinal cavity modes. FIG. 5 shows the spectrum that was measured after a wooden object (i.e., target 180) was placed in the cavity within the microwave beam. The portion of the target 180 that was intercepted by the microwaves consists of a single wooden 2×4 plank (i.e., stud) oriented vertically (i.e., upright and hence transverse to the ground surface) with the short dimension parallel to the cavity axis 145.

This caused an overall drop of about 2 dB in the measured signal strength across the 4 GHz to 5 GHz band. More important, the presence of the target (in the anechoic chamber) also introduced a perturbation into the modal structure so that the modes exhibited the same strong-weak-strong-weak pattern of oscillations that is shown in the water wave graph of FIG. 3 for the fish tank. This represents the spectral signature expected for a target 180 placed in the center of the cavity 140.

In particular, FIG. 5 shows the received spectrum as a plot 500 with the upright wooden 2×4 plank disposed in a 10 m cavity 140 at a position near the center at 5 m from either end. This graph features frequency between 4 GHz and 5 GHz as the abscissa 510 and received power in dBm as the ordinate 520. A continuous line 530 represents the power for each frequency with the plank target near the center the anechoic chamber that defined the cavity 140. In order to display this position information in a quantitative manner, the spectral perturbations caused by the target must be extracted. This can be accomplished by identifying the frequencies of the mode peaks in the unperturbed data of FIG. 4, examining the same frequencies in the FIG. 5 data, subtracting away the unperturbed spectrum, and Fourier transforming the difference. The results are shown in FIG. 6.

Figure 6:
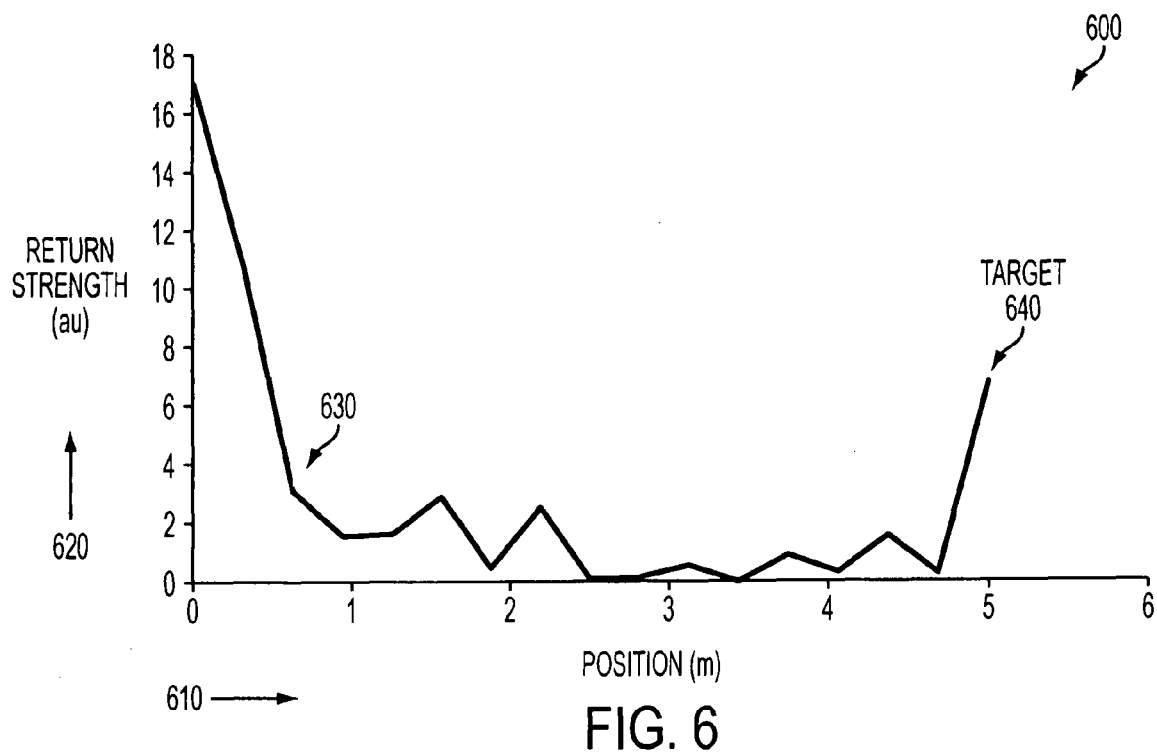
FIG. 6 is a position plot of an electromagnetic microwave signal with a wooden target at the center of the region.

In particular, FIG. 6 shows the resulting MCAT scan of this configuration with the upright wooden 2×4 plank disposed at the cavity center. This graph features distance from the cavity's boundary edge in meters as the abscissa 610 and return strength in arbitrary units as the ordinate 620. A continuous line 630 denotes the deviation from average cavity materials properties caused by the plank target as a function of position along the length of the cavity. The "radar return" from the target 180 denoted by an arrow 640 is shown at the right side of the plot 600. This indicates an abrupt change in the materials properties intercepted by the microwave beam at the center of the cavity (i.e., the 5 m position of the 10 m cavity length). The large difference feature at the left side of the plot 600 is believed to be an artifact caused either by the antenna horn resonances or by the modal perturbations induced, by the presence of the two horn antennas in the cavity.

Figure 7:
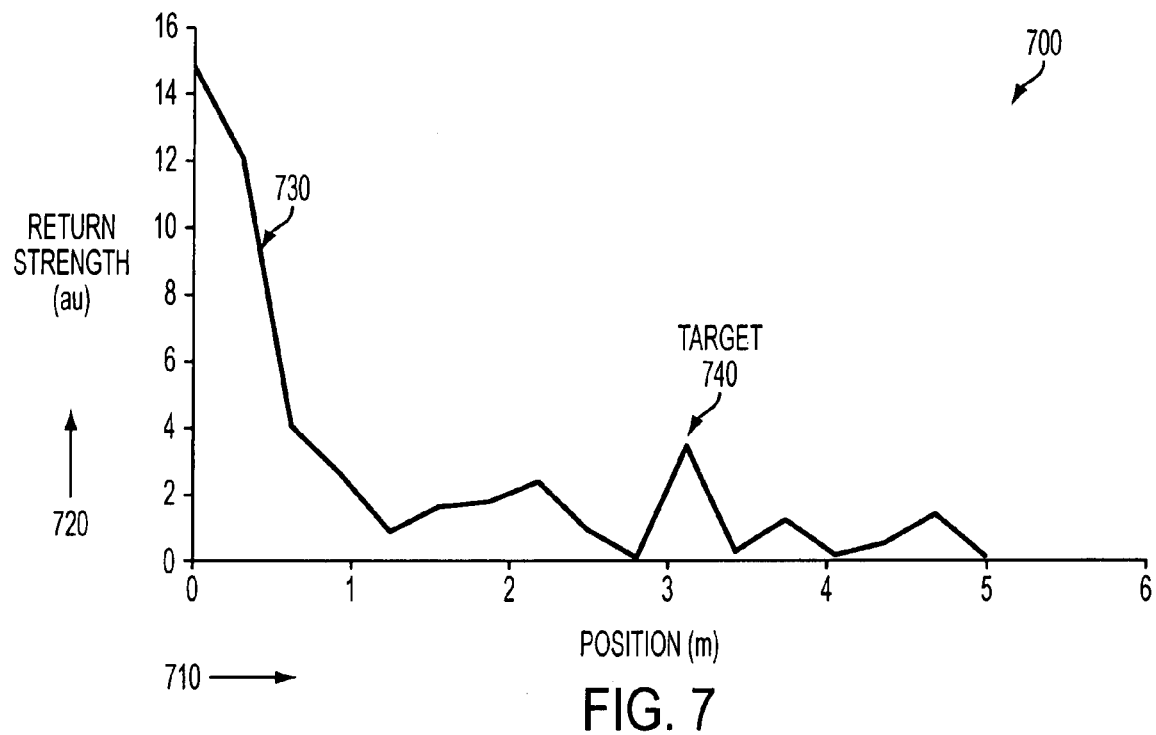
FIG. 7 is a position plot of an electromagnetic microwave signal with a wooden target midway between the center and one end of the region.

Other target configurations were also investigated to ensure that the MCAT Algorithm faithfully responds to different target locations. FIG. 7 shows a plot 700 of the MCAT scan for the same upright wooden 2×4 plank, but disposed about 3 m from the receiver reflector 155. This graph features distance from the cavity's boundary edge in meters as the abscissa 710 and return strength as the ordinate 720. A continuous line 730 denotes the deviation from average cavity materials properties caused by the plank target as a function of position along the length of the cavity. The target's location is denoted by an arrow 740 shown near the center of the plot 700

FIGS. 6 and 7 illustrate the sensitivity of the MCAT system to targets that are composed primarily of dielectric materials (e.g., wood). To deploy an MCAT network to detect buried IEDs or land mines, however, the system must demonstrate response to metallic objects also. In order to show this capability, a second target consisting of a vertically-oriented (i.e., upright) metal pipe supported at the bottom by a circular, metallic base was disposed in the cavity at a distance of 1.6 m from the receiver reflector 155, and spectra were acquired. The resultant MCAT scan is shown in FIG. 8.

Figure 8:
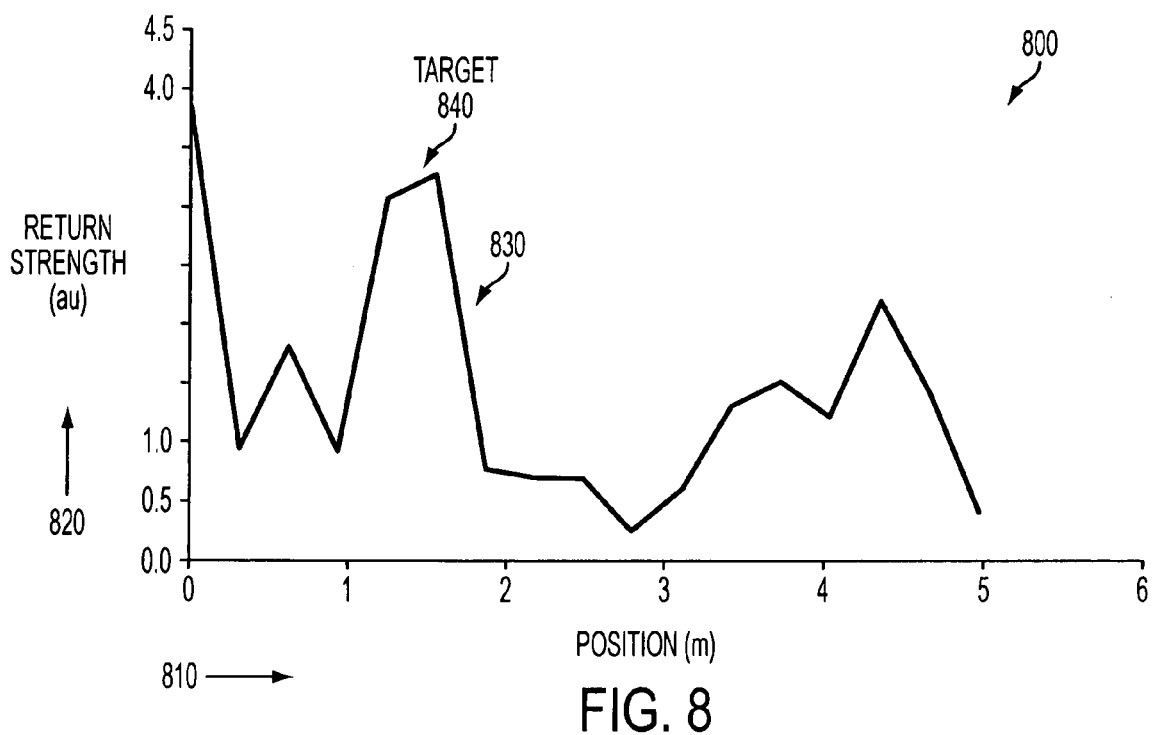
FIG. 8 is a position plot of an electromagnetic microwave signal with a metal target quarter-way between the center and one end of the region.

In particular, FIG. 8 shows a plot 800 of the MCAT scan for the metal pipe and base, disposed about 1.6 m from the receiver reflector 155. This graph features distance from the cavity's boundary edge in meters as the abscissa 810 and return strength as the ordinate 820. A continuous line 830 denotes the deviation from average cavity materials properties caused by the plank target as a function of position along the length of the cavity. The target's location is denoted by an arrow 840, shown near the 1.5 meter position along the cavity length in the plot 800.

Application: The first application of the tomography algorithm described herein was developed for the location of atomic scale crystallographic defects lying within the active layers of semiconductor lasers. The cavity lengths of such low power communications lasers are typically in the neighborhood of 250 μm (micrometers). The successful application of this algorithm to the 15 cm fish tank required that the algorithm be scaled up by a factor of about six-hundred from the laser scales. The second step upward to our 10 m anechoic cavity involves a total scaling factor of about forty-thousand from the laser length scales. To incorporate the MCAT Algorithm on the battlefield would typically require an additional increase in scale by about an additional factor of a thousand, or three orders of magnitude.

This factor of a thousand can be accomplished in approximately three further steps. The first of these would involve a cavity length of 150 meters and will take place near the flight line in the Maginiot Open Air Test Site (MOATS) Facility at Dahlgren. Pending approvals by Base Operations, Safety, and the Flight Line organizations, the second step would involve a path of 1500 m and may be performed adjacent to the Dahlgren Flight Line. The final scale-up to a 10 km path and the transition to an underground path will need to be accomplished at an off-base facility such as Yuma, Ariz. where the testing of a 10 km MCAT will not interfere with other activities and the soil is sufficiently dry to approximate conditions in the Middle East.

The system described herein could be deployed as an automated network of sensors, spaced at regular intervals along a roadway of interest. For example, the straight line distance from Baghdad to Tikrit is about 159 km. If there were a road running directly between the cities and assuming that a separation of 10 km between neighboring stations yields acceptable sensitivity and spatial resolution in the Iraqi soil, then this road would be divided into sixteen segments, each of 10 km in length, and thus employ seventeen sensor stations, the first equipped with one transmitter and a mirror, and the last equipped with one receiver and a mirror. The fifteen stations along the roadway would each employ two reflectors, one transmitter, and one receiver.

The computers controlling each receiver would be programmed to command the local spectrum analyzer to measure an RF spectrum at periodic intervals such as every 5 minutes. Each spectrum would be uploaded to the local controlling computer, which would then process the data according to the algorithm, extract the intelligence function, and compare that with intelligence functions extracted from previous scans measured from the same volume of soil.

If the software determines that a significant, new peak suddenly appears in one of the sixteen straight road segments between Baghdad and Tikrit and remains stable for a predetermined period of time, the computer 170 would be programmed to automatically raise an alarm and relay the coordinate information of the new signal peak to Coalition personnel, who can then dispatch appropriate forces to take action as determined by the local commanding officer.

In summary, microwave frequency computer-aided tomography (MCAT) can be implemented by spectral analysis in an excited Fabry Perot cavity as a means of detecting and locating hostile agents crossing security perimeters or buried enemy ordnance such as IEDs within localized volumes such as the soil lying underneath roadways upon which Coalition military vehicles must travel on a regular basis.

This disclosure presents a description of the fundamental principles upon which such a detection system is based and contains the results of two trials of the system; the first implemented with ultrasonic acoustic waves in a 15 cm fish tank and the second with microwaves in a 10 m cavity housed within an anechoic chamber. We report the computation of MCAT scans containing peaks whose locations correspond accurately to the target positions for targets composed of wood and metal. These results indicate technical feasibility to extract from measured cavity spectra an intelligence function giving the locations of inhomogeneities lying within the cavity, particularly buried IEDs.

Twin-Lead Embodiment: In an alternative embodiment, the attenuation of the medium can be circumvented by stretching a pair of parallel wires along a distance L and across a width W to be interrogated. It is also possible to use existing local infrastructure such as overhead power lines to implement a sensor under the proper conditions.

Figure 9:
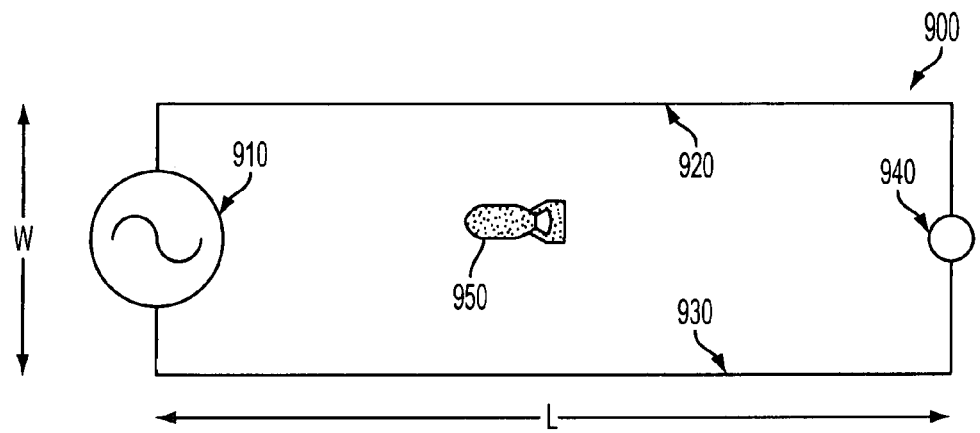
FIG. 9 is a block diagram view of the system for a twin-lead embodiment.

FIG. 9 illustrates a block diagram 900 showing the twin-lead configuration. A signal oscillator 910 provides a tuned alternating current (AC) (AC) signal along the parallel conductor transmission line comprised by wires 920 and 930. The wire leads 920, 930 stretch along the distance L and separated by the width W to a terminus 940 enclosing a target 950. Depending on the configuration of the circuit, the terminus 940 may be open or closed. The characteristic impedance of the parallel conduction transmission line may be represented by the relation:

$$Z_0 = 276 \log_{10}\left(\frac{2W}{a}\right), \quad (10)$$

where $Z_0$ is the impedance in $\Omega$ (ohms), W the spacing width between the wires and a is wire diameter, both lengths in comparable units. As can be observed from eqn. (10), impedance increases with increasing width and decreasing wire diameter.

For the terminus 940 being open, the system 900 represents a shunt or open loop, which can be schematically described as a parallel inductor-capacitor circuit. This shunt signal is reflected at the terminus 940. For the terminus 940 being closed, the system 900 represents a short circuit at the terminus 940 so that impedance remains zero at all frequencies. This short signal is bounded at the terminus 940, which may include a power meter, while the circuit at oscillator 910 remains open.

Figure 10:
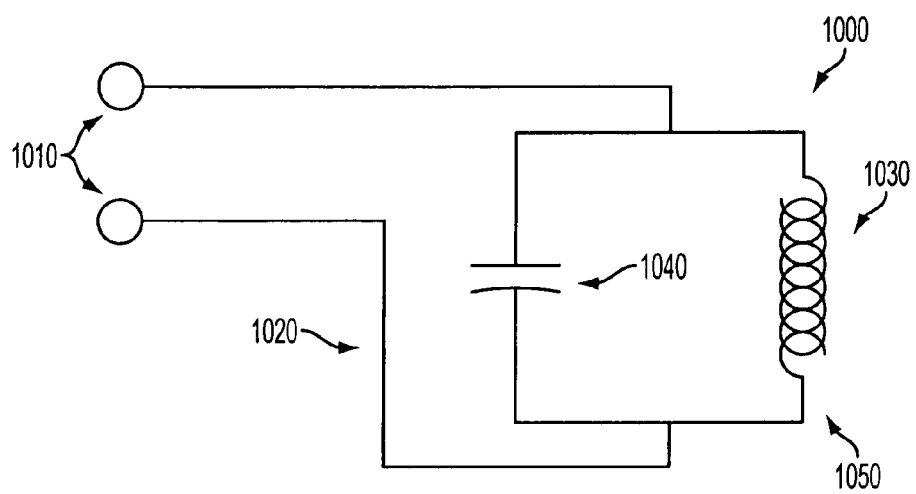
FIG. 10 is an electric circuit diagram of a high impedance (open circuit) condition for the twin-lead embodiment.
Figure 11:
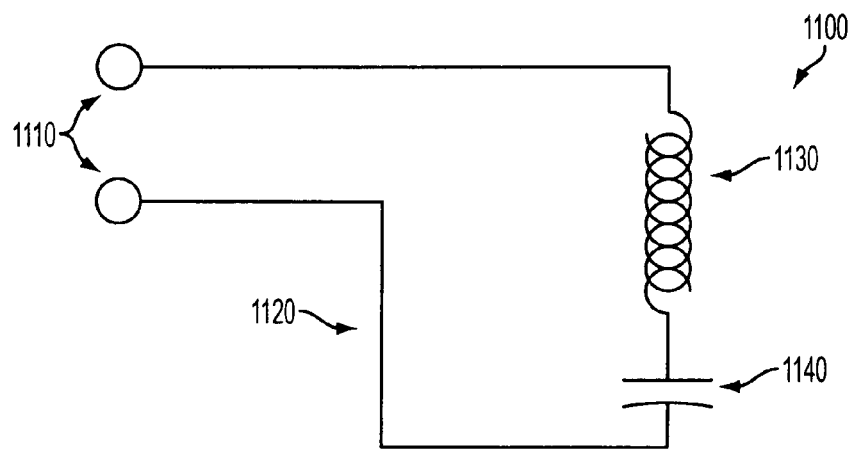
FIG. 11 is an electric circuit diagram of a low impedance (closed circuit) condition for the twin-lead embodiment.

FIG. 10 shows an electrical schematic 1000 for the parallel inductor-capacitor circuit (also known as a "tank" circuit) that behaves as an open circuit or shunt. The oscillator 910, represented by nodes 1010 are connected by a circuit 1020 that includes an inductor 1030 and a capacitor 1040 connected together in a parallel loop 1050, thereby causing high impedance at resonance. FIG. 11 shows an electrical schematic 1100 for the series inductor-capacitor circuit that behaves as a low impedance or near short circuit at resonance. The oscillator 910, represented by nodes 1110 are connected by a circuit 1120 that includes an inductor 1130 and a capacitor 1140 connected together in series. This behaves as though the oscillator had been terminated with a series resonant inductor-capacitor circuit representing the transmission line stub.

Figure 12:
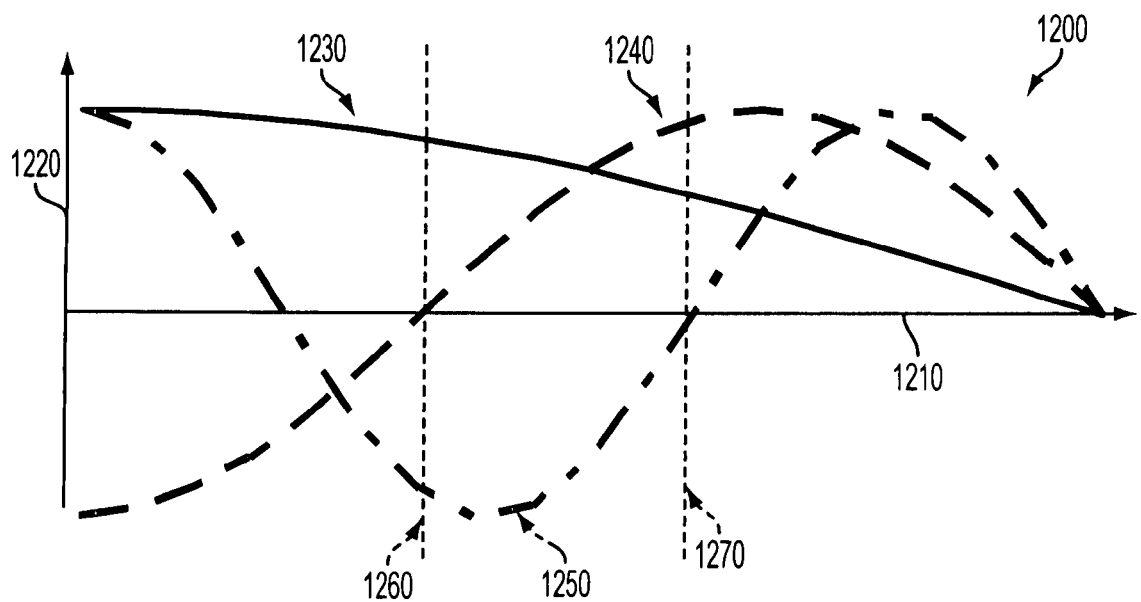
FIG. 12 is a mode plot of electric field vs. distance for the three lowest frequency transmission line modes for a closed or short circuit at the far end of the transmission line stub.

The closed circuit, with the terminus 940 representing a closed switch, reflects waves as odd harmonics of the quarter wave-length defined by the distance L. As described previously, each closed circuit wavelength $\lambda$ in the cavity has an harmonic expressed as $L=(2n+1)\lambda/4$, where n is a non-negative integer 0, 1, 2, . . . N. These harmonics are shown in FIG. 12 as a plot 1200 for three lowest values of n. This graph features normalized distance between the oscillator 910 and the terminus 940 as the abscissa 1210 and wave amplitude as the ordinate 1220. The plot 1200 shows harmonic cosine curves for n=0 as solid line 1230, n=1 as dash line 1240 and n=2 as dot-dash line 1250. Vertical lines are shown at about ⅓ and ⅝ of distance L at 1260 and 1270, respectively.

As can be observed, the first line 1260 shows high (absolute) amplitudes for the first and third harmonic curves 1230, 1250, but is negligible for the second harmonic curve 1240; and the second line 1270 shows high-to-moderate amplitudes (e.g., received power) for the first and second harmonic curves 1230, 1240, but is negligible for the third harmonic curve 1250. These differences can be exploited by a spectrum analyzer to determine amplitude differences induced by a target's presence.

In particular, a target located at ⅓ L may absorb the electromagnetic energy for the first and third wave modes (having non-zero magnitudes), but not the second mode (having substantially no magnitude). Alternately, for the target position at ⅝ L may absorb the electromagnetic energy for the first and second modes, but not the third mode. Evaluation of additional modes enables intermediate positions within the modal region to be compared. The different levels of absorption depending on which modes are affected provides an indicator of the target's location. In this quarter wave example, the transmission line stub appears as a resonant circuit in which the capacitive impedance component is given by $Z_C=-j/(2\pi f C)$, where C is the capacitance per unit length of transmission line, f is frequency, and $j=\sqrt{-1}$ represents the imaginary coefficient.

Figure 13:
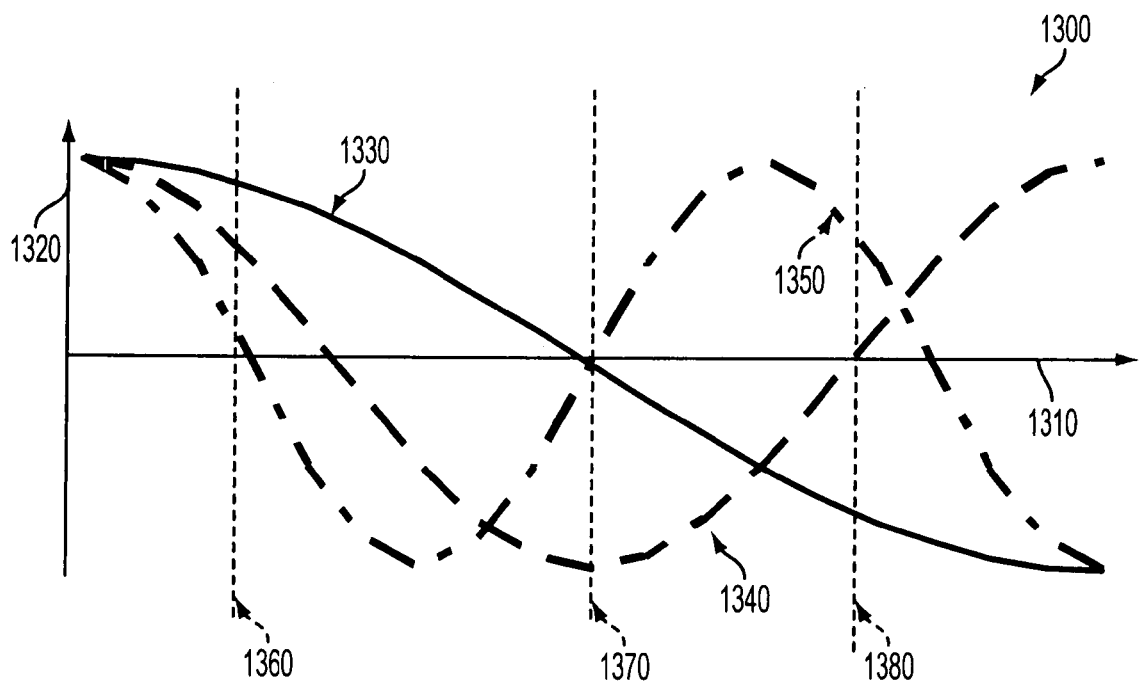
FIG. 13 is a mode plot of electric field vs. distance for the three lowest frequency transmission line modes for an open-circuit condition at the far end of the transmission line stub.

Similarly, each open circuit wavelength $\lambda$ in the cavity has an harmonic expressed as $L=(n+1)\lambda/2$, where n is a non-negative integer 0, 1, 2, . . . N. These harmonics are shown in FIG. 13 as a plot 1300 for three lowest values of n. This graph features normalized distance between the oscillator 910 and the terminus 940 as the abscissa 1310 and wave amplitude as the ordinate 1320. The plot 1300 shows harmonic cosine curves for n=0 as solid line 1330, n=1 as dash line 1340 and n=2 as dot-dash line 1350. Vertical lines are shown at about ⅛, ½ and ¾ of distance L at 1360, 1370 and 1380, respectively.

As can be observed, the first line 1360 shows high-to-moderate (absolute) amplitudes for the first and second harmonic curves 1330, 1340, but is negligible for the third harmonic curve 1350. The second line 1370 shows high amplitude for the second harmonic curve 1340, but is negligible for the first and third harmonic curves 1330 and 1350. The third line 1380 shows high-to-moderate amplitudes for the first and third harmonic curves 1330, 1350, but is negligible for the second harmonic curve 1340.

In particular, a target located at ⅛ L may absorb the electromagnetic energy for the first and second modes, but not the third mode. Alternately, for the target position at ½ L, the electromagnetic energy may be absorbed for the second mode, but not the first and third modes. Similarly, the target at ¾ L may absorb at the first and third modes, but not the second mode. These differences can be exploited by a spectrum analyzer to determine amplitude differences induced by a target's presence. The open circuit represents a high-impedance circuit with $Z_L=j2\pi fL$.

A circuit's impedance is a complex quantity (i.e., having real and imaginary components) that can be more generally expressed by the relation $$Z = R + j\left(2\pi fL - \frac{1}{2\pi fC}\right) = R + Z_L + Z_C, \quad (11)$$

where R is the real component resistance. At low frequencies, the $Z_C$ term in eqn. (11) dominates so that the circuit appears capacitive. At high frequencies, the $Z_L$ term in eqn. (11) dominates so that the circuit appears inductive. At the natural or resonant frequency $f_r = \{2\pi\sqrt{(LC)}\}^{-1}$ for the parallel circuit in FIG. 10, the $Z_C$ and $Z_L$ terms cancel, producing a pure resistance circuit having no imaginary component. The presence of a target in the vicinity of the transmission line sensor alters either the real and/or the imaginary components of the transmission line impedance. The changes so produced may vary as a periodic function of the mode number being measured. The exemplary embodiments provide for detection of a target despite its concealment by signal absorption.

Figure 14:
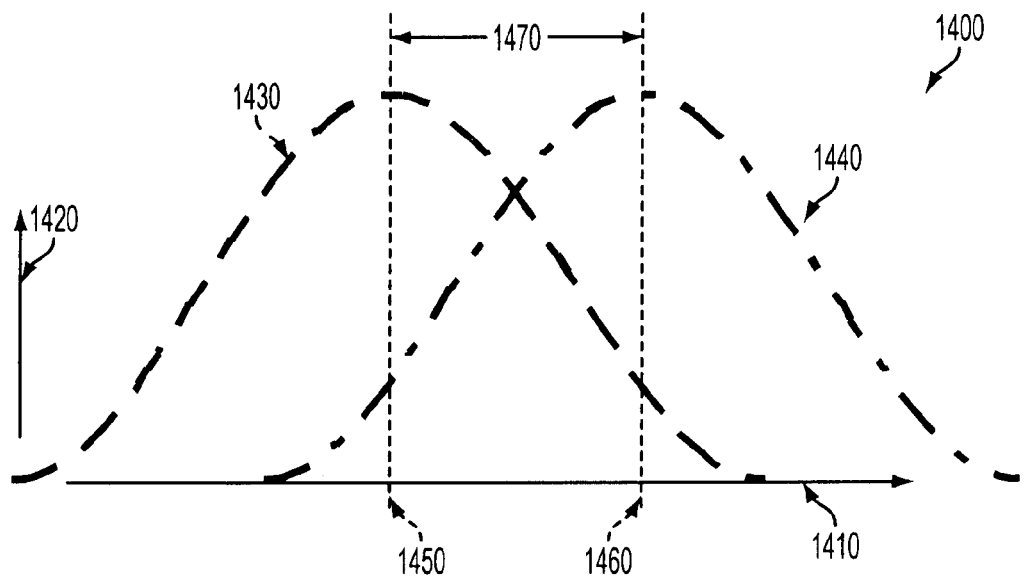
FIG. 14 is a frequency shift plot based on target presence.

Resolution of the target's presence by the signal analyzer 160 may be determined by various methods, such as comparing amplitudes of peaks of signals with and without the target's influence 340, 330 for select harmonic frequencies, as described for FIG. 3. Alternatively, the signal analyzer 160 may determine a frequency offset for conditions of adequate quality and finesse. FIG. 14 shows a plot 1400 with frequency f as the abscissa 1410 and wave amplitude as the ordinate 1420. The plot 1400 features a nominal inverse cosine function wave 1430 and an offset inverse cosine function wave 1440 influenced by the target for a single mode. The nominal wave has peak amplitude at a first frequency 1450, and the offset wave has peak amplitude at a second frequency 1460, the two frequencies being offset by a frequency difference Δf shown as a gap 1470. This offset can be determined for each mode over a series to characterize the absorption and reflection characteristics of the target.

Figure 15:
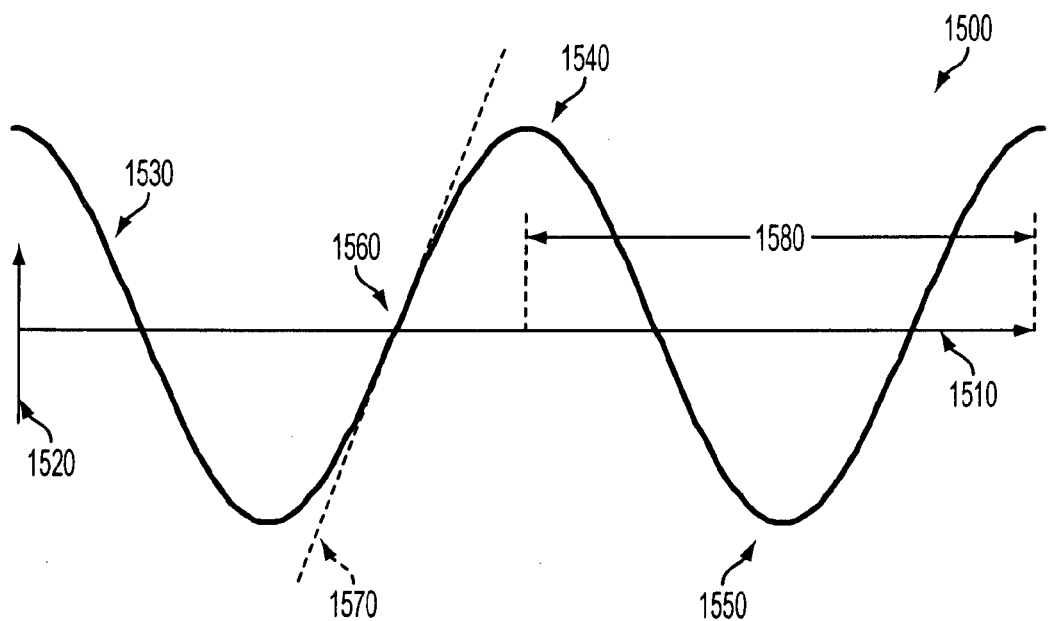
FIG. 15 is a frequency shift plot as a function of modes.

The frequency difference Δf can then be plotted over a series of modes to thereby determine the pattern of shifts induced by the target. Information on the target location is contained within the pattern. FIG. 15 shows a plot 1500 with mode numbers as the abscissa 1510 and frequency difference Δf as the ordinate 1520. As can be observed, the value of the frequency shift is a periodic function of the mode number, and both positive and negative shifts are observed. This frequency shift is shown in this example to vary as a sinusoidal wave 1530 having positive maxima 1540 and negative minima 1550 at the extrema. The sinusoidal wave 1530 illustrates a continuous curve produced from a collection of discrete values for each mode. At the inflection points 1560, the frequency shift reaches zero, reflecting modes with resonant frequencies unperturbed by the target. The slope 1570 at the inflection points 1560 provides a measure of the maximum rate of change in frequency shift with respect to transmission line mode number.

As the slope 1570 increases (i.e., becomes steeper), the target may be moving closer to the center of the cavity of the twin-lead configuration 900 along its longitudinal axis, or the target may be moving closer to the transmission line conductors 920, 930 themselves. A power meter that inductively senses the current through the transmission fine 920 of the twin-lead circuit 900 may provide the output signal to be analyzed by a suitable instrument, such as a power meter or a spectrum analyzer. The modal curve has a wavelength or period 1580 that corresponds to the target's position with respect to the cavity ends. For a target about mid-way between the ends of the cavity, the corresponding wavelength is short, providing rapid peak-to-peak oscillations across the modes from one to the next. By contrast, for a target in proximity to one of the ends of the cavity, the corresponding wavelength or period is large, appearing as a gradual undulating curve across the modes. The wavelength or period of the oscillations in the mode plot therefore contains information about the physical location of the target with respect to the transmission line sensor.

Figure 16:
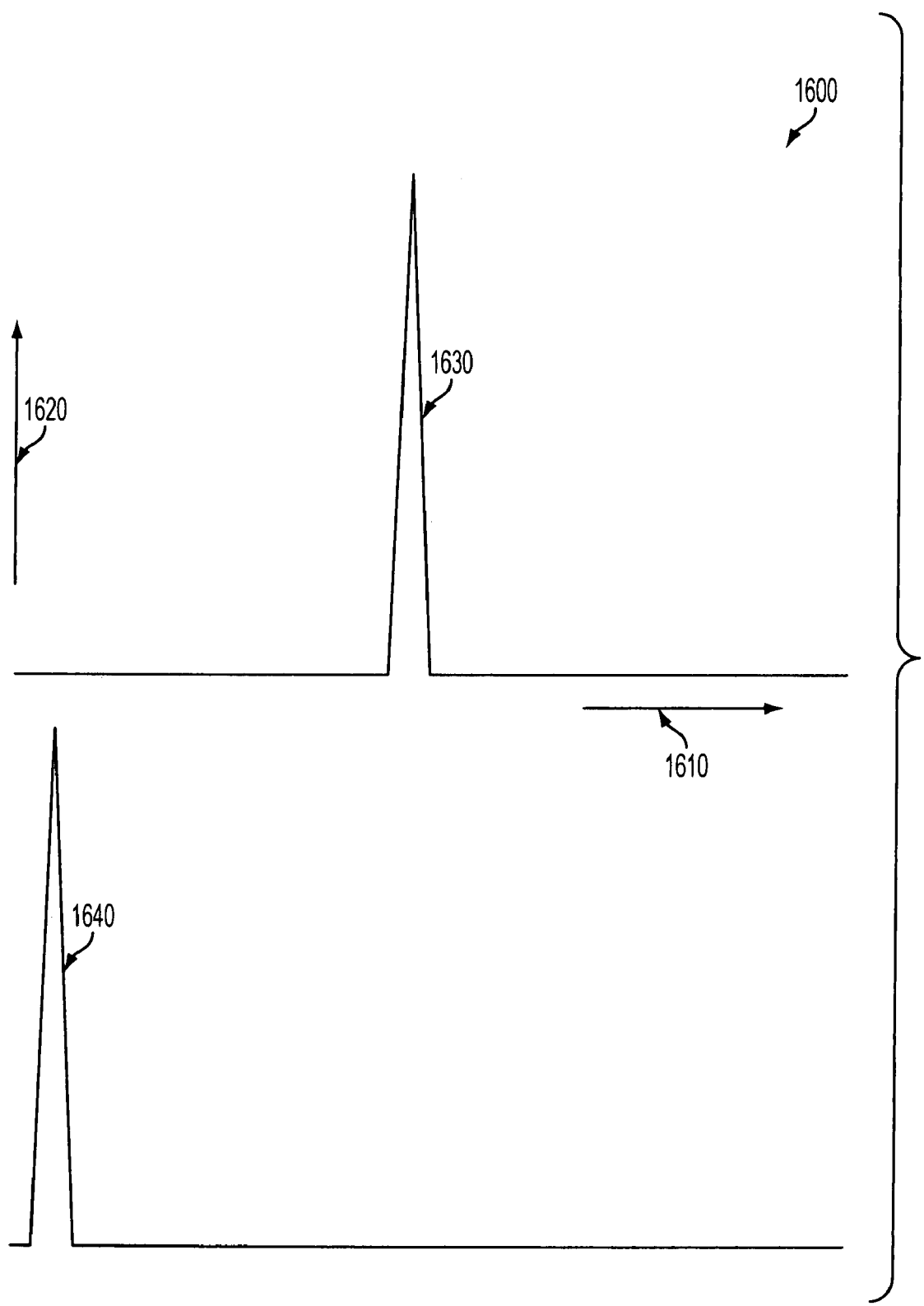
FIG. 16 is a transform plot from modes to position.

In this transmission line implementation, resolving the target's position along the length of the sensor from the modal frequency differences can be accomplished by Fourier transform. An example technique for providing the frequency-to-position function translation is the discrete FFT. FIG. 16 shows a plot 1600 illustrating relative position of the target or object (i.e., of the source of electromagnetic absorption and/or reflection) along the cavity's longitudinal axis 145 in correspondence to the frequency difference variation with modes.

The abscissa 1610 represents this relative position, and the ordinate 1620 represents deviations away from the average properties of the material surrounding the sensor (as lines 920 and 930 shown in FIG. 9). Idealized (i.e., absent noise) above and below peaks 1630, 1640 are plotted from the Fourier transform of the modal frequency differences. (Both non-elevated levels adjacent either side of the peaks correspond to average properties of the material surrounding the target.) The upper peak 1630 represents the target's position near the center of the cavity. By contrast, the lower peak 1640 represents the target's position adjacent an edge of the cavity.

Those of ordinary skill in the art will recognize that although electromagnetic waves have been described with particularity, and even more specifically in conjunction with the microwave portion of the spectrum, application of these principles can be extended to other wave propagators, including acoustic signals through a material medium, and the frequencies utilized may vary from the low kilohertz well into the Gigahertz without departing from the spirit of the invention.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for detecting an object within a defined region having a longitudinal axis, the method comprising:
    disposing first and second wave reflectors within the region at opposite ends of the axis, the wave reflectors separated by a cavity length;
    transmitting a band-width plurality of electromagnetic microwave signals over a predetermined bandwidth into the region in proximity to the first reflector to produce a standing wave pattern;
    measuring a received signal in proximity to the second reflector;
    extracting an appropriate parameter from the received signal to obtain a received characteristic, the parameter dependent on a longitudinal mode of the length;
    comparing the received characteristic town established characteristic that lacks the object to obtain a characteristic differential; and
    analyzing the characteristic differential to obtain a position of the object between the reflectors.

2. The method according to claim 1, wherein the appropriate parameter for obtaining the received and established characteristics is at least one of frequency, power, quality and finesse.

3. The method according to claim 1, wherein the analyzing operation further includes Fourier transforming the characteristic differential.

4. The method according to claim 1, wherein the analyzing operation further includes transforming the characteristic differential by Discrete Fourier-transform.

5. The method according to claim 1, wherein the comparing operation further comprises:
    comparing a first amplitude at a received mode to a second amplitude at an established mode to determine a difference between the first and second amplitudes.

6. The method according to claim 5, wherein the analyzing operation further comprises:
    Fourier transforming the characteristic difference over a plurality of wave modes to obtain the position for the object.

7. The method according to claim 1, wherein the appropriate parameter is frequency, and comparing operation further includes determining an offset between a first frequency for the received signal and a second frequency for the established signal.

8. The method according to claim 1, wherein the parameter is photon density $S_m$ and the characteristic is mode loss $\alpha_m$, being each associated with associated with the $m^{th}$ longitudinal mode, the mode loss being related by:

$$\alpha_m = \alpha_0 + \int_0^L G(z)|E_m(z)|^2 \, dz,$$

where G is spatially dependant loss called intelligence function, $E_m$ is electric field distribution of the $m^{th}$ mode, and z is spatial interval over integral across reflection distance L, the photon density being related by:

$$S_m = \frac{nC_m P_t}{c\left(\alpha_0 + \frac{L\overline{G}}{2} + \frac{1}{2}\hat{G}^+(\lambda)\right)} \text{ (per cubic meter),}$$

where n is index of refraction, $C_m$ is probability per unit time of exciting a photon in the $m^{th}$ mode, $P_t$ is average transmitted radio frequency power, c is the speed of light, $\alpha_0$ is background loss, $\overline{G}$ is average intelligence function and $\hat{G}^+$ is Inverse Discrete Fourier Transform of the intelligence function, the electric field distribution related by:

$$E_m(z) = \sin\frac{2\pi z}{\lambda_m},$$

where $\lambda$ is closed circuit wavelength, and the intelligence function G is solvable by:

$$G(z) = FFT\left[\frac{2nC_m P_t}{cS_m} - 2\alpha_0\right],$$

where FFT designates Discrete fast-Fourier Transform operation.

9. A system for detecting an object within a defined region having a longitudinal axis, the system comprising:
    first and second electromagnetic reflectors disposed within the region at opposite ends of the axis, the wave reflectors separated by a cavity length;
    an electromagnetic signal transmitter for transmitting a plurality of electromagnetic microwave signals over a predetermined bandwidth into the region in proximity to the first reflector to produce a standing wave pattern;
    an electromagnetic signal receiver for measuring a received signal in proximity to the second reflector;
    an extracter for extracting an appropriate parameter from the received signal to obtain a received characteristic, the parameter dependent on a longitudinal mode of the length;
    a comparator for comparing the received characteristic to an established characteristic that lacks the object to obtain a characteristic differential; and
    an analyzer for analyzing the characteristic differential to obtain a position of the object between the reflectors.

10. The system according to claim 9, wherein the appropriate parameter to obtain the received and established characteristics is at least one of frequency, power, quality and finesse.

11. The system according to claim 9, wherein the analyzer performs Fourier transform on the characteristic differential.

12. The system according to claim 11, wherein the analyzer Fourier transforms the characteristic difference over a plurality of wave modes to obtain the position for the object.

13. The system according to claim 9, wherein the analyzer transforms the characteristic differential by Discrete Fourier-transform.

14. The system according to claim 9, wherein the comparer compares a first amplitude at a received mode to a second amplitude at an established mode to determine a difference between the first and second amplitudes.

15. The system according to claim 9, wherein the parameter is photon density $S_m$ and the characteristic is mode loss $\alpha_m$, being each associated with associated with the $m^{th}$ longitudinal mode, the mode loss being related by:

$$\alpha_m = \alpha_0 + \int_0^L G(z)|E_m(z)|^2 \, dz,$$

where G is spatially dependant loss called intelligence function, $E_m$ is electric field distribution of the $m^{th}$ mode, and z is spatial interval over integral across reflection distance L, the photon density being related by:

$$S_m = \frac{nC_m P_t}{c\left(\alpha_0 + \frac{L\overline{G}}{2} + \frac{1}{2}\hat{G}^+(\lambda)\right)} \text{ (per cubic meter)},$$

where n is index of refraction, $C_m$ is probability per unit time of exciting a photon in the $m^{th}$ mode, $P_t$ is average transmitted radio frequency power, c is the speed of light, $\alpha_0$ is background loss, $\overline{G}$ is average intelligence function and $\hat{G}^+$ is Inverse Discrete Fourier Transform of the intelligence function, the electric field distribution related by:

$$E_m(z) = \sin\frac{2\pi z}{\lambda_m},$$

where $\lambda$ is closed circuit wavelength, and the intelligence function G is solvable by:

$$G(z) = FFT\left[\frac{2nC_m P_t}{cS_m} - 2\alpha_0\right],$$

where FFT designates Discrete fast-Fourier Transform operation.

* * * * *